United States Patent
Tsukada et al.

(10) Patent No.: US 6,562,493 B2
(45) Date of Patent: *May 13, 2003

(54) BATTERY, LEAD MEMBER FOR BATTERY CONNECTION, AND BATTERY PACK USING THE SAME

(75) Inventors: Masazumi Tsukada, Maebashi (JP); Reiji Nishikawa, Yokohana (JP); Hideaki Kitazume, Maebashi (JP); Tsutomu Matsui, Takasaki (JP); Noriyuki Shimizu, Takesahi (JP); Kayo Tanaka, Ichihara (JP); Kaoru Hosobuchi, Tokyo (JP)

(73) Assignee: Toshiba Battery Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,445

(22) Filed: Mar. 18, 1999

(65) Prior Publication Data

US 2002/0012838 A1 Jan. 31, 2002

(30) Foreign Application Priority Data

Mar. 18, 1998 (JP) .................... 10-068908
Mar. 18, 1998 (JP) .................... 10-068909

(51) Int. Cl.[7] ............... H01M 14/00; H01M 2/06
(52) U.S. Cl. ............. 429/7; 429/176; 429/99; 429/179
(58) Field of Search .............. 429/99, 100, 7, 429/9, 163, 176, 179

(56) References Cited

U.S. PATENT DOCUMENTS

| | | | |
|---|---|---|---|
| 3,607,439 A | * | 9/1971 | Lilley |
| 4,431,713 A | * | 2/1984 | Fehling et al. .............. 429/7 |
| 5,197,889 A | * | 3/1993 | Rizzo et al. ................ 439/76 |
| 5,761,792 A | * | 6/1998 | Alexandres et al. ....... 29/623.3 |
| 5,993,994 A | * | 11/1999 | Ohmura et al. ............. 429/176 |
| 6,071,557 A | * | 6/2000 | Haraguchi et al. ......... 429/168 |

FOREIGN PATENT DOCUMENTS

| | | |
|---|---|---|
| EP | 0494504 A2 | 7/1992 |
| EP | 0607675 A1 | 7/1994 |
| EP | 0725453 A1 | 8/1996 |
| EP | 0807984 A1 | 11/1997 |
| EP | 0809307 A2 | 11/1997 |
| EP | 0822266 A1 | 2/1998 |

OTHER PUBLICATIONS

Patent ABSTRACTS of JAPAN, vol. 107, No. 050, Jan. 29, 1993—abstract of JP 04–264358 A (Toshiba Battery Co., Ltd, Sep. 21, 1992.

* cited by examiner

*Primary Examiner*—Carol Chaney
*Assistant Examiner*—Tracy Dove
(74) *Attorney, Agent, or Firm*—Oblon, Spivak, McClelland, Maier & Neustadt, P.C.

(57) ABSTRACT

Provided are a battery and a lead member, designed so that high strength of weld between them can be maintained with less variation despite the supply of lower welding current thereto when the lead member is welded to the outer surface of the battery by the parallel resistance welding method, and a battery pack using the same. A layer of an Ni-based alloy, e.g., an Ni—Fe alloy, is formed on a part or the whole of the outer surface of the battery. The lead member for battery connection is composed of a substrate and an Ni—Sn alloy layer formed on that surface of the substrate which is welded to the outer surface of the battery. The battery pack is composed of a battery group that is assembled by using the battery and/or the lead member and stored in a shell.

26 Claims, 6 Drawing Sheets

(Prior Art)

BATTERY, LEAD MEMBER FOR BATTERY CONNECTION, AND BATTERY PACK USING THE SAME

BACKGROUND OF THE INVENTION

1. Field of the Invention

The present invention relates to a battery, a lead member for battery connection (hereinafter referred to as lead member) welded to the outer surface of the battery by the parallel resistance welding method, and a battery pack using the same, and more specifically, to a battery and a lead member having surface conditions such that high weld strength can be realized in a stable state between the lead member and a battery container of the battery when the lead member is welded to the outer surface of the battery, and a battery pack using the same.

2. Prior Art

With the spread of various electric and electronic devices, an increasing number of devices have started to be designed so that they directly incorporate a battery pack that includes a plurality of connected batteries as drive sources. Charging or discharging the batteries of these devices requires use of lead members for electrical connection between the batteries and between package terminals and the batteries. Thus, a lead member must be fixed to the outer surface of each battery, e.g., a part of the surface of its container, such as the cover or bottom portion thereof.

FIGS. 1 and 2 show an example of the battery pack.

FIG. 1 is a perspective view showing an outline of the battery pack. This battery pack A is composed of a battery group (mentioned later) stored in a shell 1 that is formed of a material such as a polycarbonate resin or polycarbonate/acrylonitrile-butadiene-styrene resin. A positive terminal 6A and a negative terminal 6B are exposed from the shell 1. Also exposed is a signal fetch terminal 6C for a built-in thermistor for the temperature control of the battery group, for example.

FIG. 2 is a perspective view schematically showing a battery group B. The battery group B includes three cylindrical batteries 2A, 2B and 2C that are connected in series with one another. More specifically, the bottom (negative terminal) of the battery 2A and the positive terminal of the battery 2B are connected by means of a lead member 3A, while the bottom (negative terminal) of the battery 2B and the positive terminal of the battery 2C are connected by means of a lead member 3B. One end of a lead member 3C is connected to the positive terminal of the battery 2A, and the other end to the positive terminal 6A of the battery pack A. One end of a lead member 3D is connected to the bottom (negative terminal) of the battery 2C, and the other end to the negative terminal 6B of the battery pack A.

Further, a thermistor 4 is interposed between the batteries 2A and 2B, and two signal lines 5A and 5B are led out of the thermistor 4. The one signal line 5A is connected to the signal fetch terminal 6C of the battery pack A, and the other signal line 5B to the lead member 3D.

It is to be understood that insulating members (not shown) are interposed as required between the batteries, between the batteries and the thermistor, etc. lest the batteries and the thermistor be shorted.

Secondary batteries, such as nickel-cadmium secondary batteries, nickel-metal-hydride secondary batteries, lithium-ion secondary batteries, are frequently used as the batteries that constitute the battery group B.

In general, each of these secondary batteries is constructed so that a specific power generating element is stored together with a prescribed electrolyte solution in a battery container, which is composed of an open-topped battery can and a cover member closing the top opening of the can.

Conventionally, the battery can, especially for alkaline batteries, is formed of an Ni-plated steel sheet. It is obtained by shaping a sheet of soft steel, such as very-low-carbon steel, into a specific bottomed can by plastic deformation and forming an Ni layer of a desired thickness on the surface of the resulting structure by Ni-plating for the purpose of rustproofing. The cover member is obtained in like manner.

Generally, on the other hand, each of the lead members that constitute the battery group B is formed of a small strip of Ni or, like the battery container, is formed of an Ni-plated steel sheet.

The following parallel resistance welding method is generally applied to the connection between the batteries and the lead members for the manufacture of the battery group B.

First, a lead member 3 to be welded is put on a surface 2a (bottom surface as illustrated) of a battery container 2, as shown in FIG. 3.

Two welding electrodes 7, each having a small-diameter distal end 7a, are arranged parallel to each other with a given space between them on a surface 3a of the lead member 3. A predetermined pressure loading from the welding electrodes 7 is applied to the lead member 3 so that a back surface 3b of the member 3 and the surface 2a of the battery container 2 are intimately in contact with each other.

In this state, a welding current of a given value is supplied from a power source 8. The welding current is applied to the lead member 3 through one welding electrode. A part of the welding current is fed back to the power source 8 through the lead member 3 and the other welding electrode. The remaining part is applied to the region right under the distal end 7a of the one welding electrode and the surrounding area, and then flows across the thickness of the lead member 3 to reach the surface 2a of the battery container 2. Thereafter, the remaining current passes through the battery container 2, flows in the thickness direction of the lead member 3 around the region right under the distal end 7a of the other welding electrode, and is fed back to the power source through the other welding electrode.

In this process, Joule heat is generated in the contact interface between the back surface 3b of the lead member 3 and the surface 2a of the battery container 2 near the region right under each welding electrode, so that both members are partially melted to form nuggets near the contact interface. Thus, the lead member 3 is fixed to the battery container 2 by spot welding.

Macroscopically, the respective surfaces of the lead member and the battery container are flat surfaces. Microscopically, however, they are complicated irregular surfaces. When the lead member is put on the surface of the battery container, therefore, these two members are not uniformly in contact with each other. More specifically, infinitesimal projections on the back surface 3b of the lead member and the surface 2a of the battery container 2 are only in contact with each other's surface. The formation of nuggets advances as current flows through the resulting infinitesimal contact portions to generate Joule heat therein.

As this is done, the welding behavior is complicated due to the influence of fine deformation of the lead member 3, which is caused as the welding electrodes 7 are pressed against the lead member 3, upon the contact state.

In the case where the battery container and the lead member are formed of a Ni-plated steel sheet, the following problems are believed to arise if they are welded by the parallel resistance welding method.

Increasing the strength of weld between the battery container and the lead member is pretty difficult and the range of operating conditions therefor is narrow. Moreover, the weld strength varies depending on the welding operation. This tendency is particularly remarkable when the lead member is welded to the bottom portion of a battery container that has a wide area for welding.

If the weld strength is not very high, then welded joints on a battery pack that is incorporated in an electric or electronic device to be actually used will possibly be broken by impact to ruin the function of the device in case the device is dropped, for example.

If the weld strength varies, moreover, it can be supposed to lower the reliability of welding of welded structures of manufactured batteries and lead members, in consideration of the fact that the welding operation is usually continuously performed in a production line.

In order to increase the strength of weld between the battery container and the lead member and reduce the variation of the strength to stabilize spot-welded joints, in the resistance welding method described above, it is necessary only that the Joule heat generated right under the two welding electrodes be intensified securely to form stable nuggets, basically.

To attain this, the generated Joule heat is intensified by setting the supplied current at a high value or lengthening the conduction time. If this is done, however, the welding electrodes sometimes may be fused to the surface of the lead member, thereby preventing composition of smooth welding processes. In some cases, furthermore, generation of excessive heat may results in production of melt dust of the metal material that constitutes the surface of the battery container and the lead member, thus lowering the weld strength, on the contrary.

OBJECTS AND SUMMARY OF THE INVENTION

An object of the present invention is to provide a battery and a lead member, designed so that high strength of weld between a battery container and the lead member can be maintained with less variation despite lower current supply thereto when the lead member is welded to the outer surface of the battery container by the parallel resistance welding method.

Another object of the invention is to provide a battery and a lead member, which require no high current supply for welding, so that welding electrodes cannot be easily fused to the lead member, and smooth welding processes can be composed without entailing production of melt dust.

Still another object of the invention is to provide a high-reliability battery pack that cannot be easily broken by external force such as impact.

In order to achieve the above objects, according to the present invention, there is provided a battery comprising a battery container and a layer of an Ni-based alloy covering a part or the whole of the outer surface of the battery container.

According to the invention, moreover, there is provided a lead member for battery connection, which is welded to the outer surface of a battery by the parallel resistance welding method, the lead member comprising a substrate and an Ni—Sn alloy layer formed at least on that surface of the substrate which is welded to the outer surface of the battery.

According to the invention, furthermore, there is provided a battery pack comprising a group of the aforesaid batteries according to the invention connected to one another by means of lead members for battery connection by the parallel resistance welding method and a shell storing the group of the batteries therein, or a battery pack comprising a group of batteries connected to one another by means of the aforesaid lead members for battery connection according to the invention by the parallel resistance welding method and a shell storing the group of the batteries therein, or a battery pack comprising a group of the aforesaid batteries according to the invention connected to one another by means of the aforesaid lead members for battery connection according to the invention by the parallel resistance welding method and a shell storing the group of the batteries therein.

DETAILED DESCRIPTION OF THE INVENTION

A battery according to the present invention will be described first.

Figure 4:
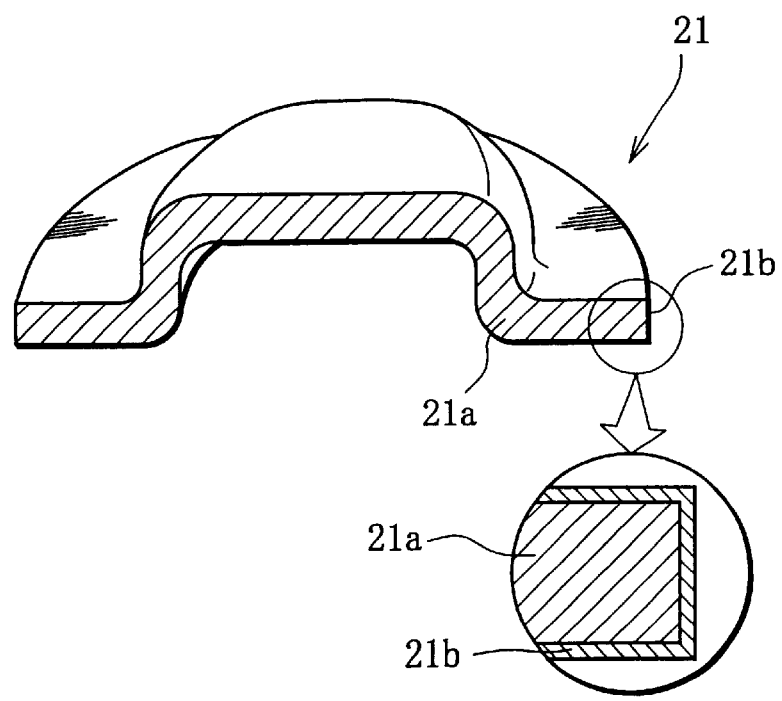
FIG. 4 is a cutaway sectional view showing an example of a battery container (cover) used in the invention.

FIG. 4 is a cutaway sectional view showing an example of a battery container of the battery of the invention.

Referring to FIG. 4, there is shown a cover member 21 that serves also as a positive terminal.

The cover member 21 includes a substrate 21a, which is a sheet of soft steel such as very-low-carbon steel, and a layer 21b of an Ni-based alloy (mentioned later). The member 21 is obtained by forming the substrate 21a into the shape shown in FIG. 4 by plastic deformation and covering its surface with the layer 21b.

The layer 21b may be formed covering the whole surface of the substrate 21a or partially covering at least those portions where a lead member, a mating member, is to be welded.

Although the cover member is shown as an example of the battery container in FIG. 4, the battery container of the battery according to the present invention is not limited to the cover member, and may alternatively be a battery can that mates with the cover member and stores a power generating element and an alkaline electrolyte solution therein.

Although the layer 21b should preferably be formed of an Ni—Fe alloy, it must only be formed of one of Ni-based alloys including an Ni—Co alloy, Ni—Zn alloy, Ni—Fe—Co alloy, etc. The layer 21b is formed by electroplating the surface of the substrate 21a.

Any of the Ni-based alloys that are formed by electroplating may be composed of a single-phase solid solution of Fe, Co, Zn and other elements in a crystal lattice of Ni or a combination of a plurality of phases. In general, its specific resistance is higher than that of simple Ni or any other simple element. If the aforementioned parallel resistance welding method is applied to a battery container that has these Ni-based alloy layers, a smaller current flow than in the conventional case enables the formation of stable nuggets, thereby ensuring improved weld strength. One of reasons for this effect is the level of the electric resistance of the layer formed of the aforesaid Ni-based alloy. Another possible factor Is the change of the mechanical properties of the materials.

The Ni—Fe alloy is a particularly effective material because it enables a small current to improve the weld strength.

If the Fe content is too high, in this case, the surface of the battery container easily rusts when it is exposed to a hot and humid environment. Preferably, therefore, the Fe content is restricted to 50% by atomic percentage or to 45% in particular.

This restriction of the Fe content can be easily achieved by adjusting the concentration of an Fe source in a plating bath for electroplating, for example.

In the case of the Ni—Co alloy, the Co content should preferably be restricted to 5 to 50% by atomic percentage. In the case of the Ni—Zn alloy, the Zn content should preferably be restricted to 5 to 30% by atomic percentage. In the case of the Ni—Fe—Co alloy, moreover, the Fe and Co contents should preferably be restricted to more than 0 to less than 50% by atomic percentage and to 5 to 50% by atomic percentage, respectively. Even in this case, however, the sum of the Fe and Co contents is restricted to 50% or less by atomic percentage.

Preferably, the thickness of the layer 21b is restricted to 5 μm or less. If the thickness exceeds 5 μm, the variation of the strength of weld on the lead member increases.

In the case where the layer 21b is formed of the Ni—Fe alloy, moreover, its thickness should preferably be restricted to 4.5 μm or less. The reason for this, though not evident, is that the strength of weld on the lead member substantially varies if the layer thickness exceeds 4.5 μm.

The thickness of the layer 21b can be easily adjusted by regulating the time and current density for electroplating, for example.

The following is a description of the lead member according to the present invention.

Figure 5:
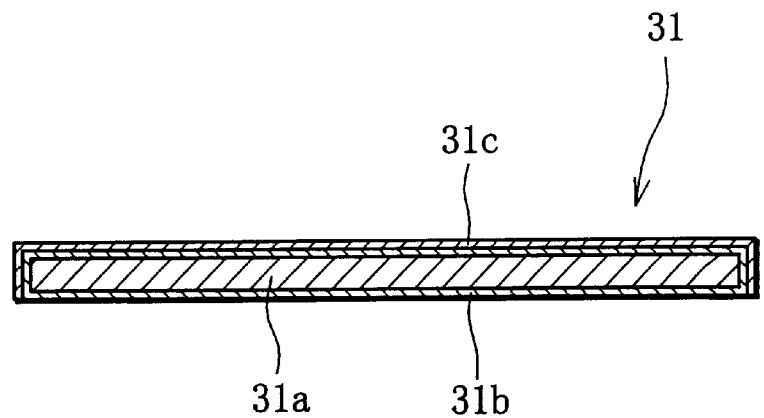
FIG. 5 is a sectional view showing a preferred example of a lead member according to the invention.

FIG. 5 is a sectional view showing an example of the lead member.

The lead member 31 is composed of a substrate 31a and an Ni—Sn alloy layer 31c covering its surface or of the substrate 31a, an under layer 31b covering the surface of the substrate 31a, and an Ni—Sn alloy layer 31c covering the surface of the layer 31b. It is to be understood that the lead member 31 is electrically conductive in either case.

The substrate 31a ensures the strength of the whole lead member and functions also as a passage through which welding current flows during actual use of the lead member. The substrate 31a may be formed of any material that has appropriate strength and electrical conductivity and can be plated. For example, low-carbon steel, Ni, etc. may be used for this purpose. Low-carbon steel is preferred because it is easily available and low-priced.

Depending on the material of the substrate 31a, an under layer 31b may be provided as an intermediate layer in order to prevent the Ni—Sn alloy layer 31c on the substrate 31a from peeling off from the surface of the substrate 31a and to ensure stable plating with the Ni—Sn alloy. Preferably, the under layer 31b is formed of a material that contains an Ni component, in consideration of the Ni—Sn alloy layer formed thereon. An Ni layer, Ni—Fe alloy layer, etc. may be used for this purpose. Alternatively, a Cu layer, Cu—Sn alloy layer, etc. may be used despite the absence of Ni.

The under layer 31b can be easily formed by applying a conventional film forming method, such as electroplating, vacuum evaporation, sputtering, etc., to the surface of the substrate 31a. Among these film forming methods, the electroplating method has an advantage over the others in film quality, film forming cost, and productivity.

In forming the under layer 31b by the electroplating method, it is necessary only that electroplating be carried out under given conditions by using a specific plating bath that contains the constituent elements of the under layer.

If the under layer 31b is too thick, distortion accumulated in the layer during film formation increases, possibly causing the under layer to crack. If the layer 31b is too thin, on the other hand, its function as an intermediate layer is lowered. Preferably, therefore, the thickness of the layer 31b is adjusted to 0.2 to 10 μm.

In the case where the Ni—Sn alloy layer 31c can be formed directly on the surface of the substrate 31a in an intimate manner, as mentioned before, the intermediate layer 31b is not essential.

The Ni—Sn alloy layer 31c is provided in order to make contact with the surface of the battery container, a mating layer, at the time of resistance welding, thereby generating intensive Joule heat in the contact interface to facilitate the formation of stable nuggets. Thus, the layer 31c serves to ensure stable and high strength of weld between the lead member and the battery container.

The Ni—Sn alloy that constitutes the layer 31c consists mainly of Ni and Sn.

In this case, the composition ratios of Ni and Sn are suitably selected in consideration of the melting point and specific resistance of the alloy. If the composition ratio of Sn is too high, the strength of weld on the battery container lowers for some unknown reasons. If the composition ratio of Sn is too low, adding the welding strength problem described above, the layer 31c is unduly brittle, and the film forming cost is high. Preferably, therefore, the composition ratio of Sn is restricted to 40 to 75 wt %.

The Ni—Sn alloy layer 31c can be formed by applying a conventional film forming method, such as electroplating, vacuum evaporation, sputtering, etc., to the surface of the substrate 31a or the under layer 31b. Among these film forming methods, the electroplating method has an advantage over the others in being capable of more easily ensuring good film properties, as well as in film forming cost and productivity.

In forming the Ni—Sn alloy layer 31c by the electroplating method, it is necessary only that the surface of the substrate 31a or the under layer 31b be electroplated under given conditions by using a plating bath that contains an Ni source, such as nickel chloride ($NiCl_2 \cdot 6H_2O$), and an Sn source, such as stannous chloride ($SnCl_2 \cdot 2H_2O$), in a predetermined concentration ratio.

If the Ni—Sn alloy layer 31c is too thick, distortion accumulated in the layer during film formation increases, depending on the Ni—Sn composition ratio and plating conditions, so that the layer 31c may crack in some cases, and the cost should be increased. If the layer 31c is too thin, on the other hand, it is difficult to secure high weld strength. Preferably, therefore, the thickness of the layer 31c is adjusted to 0.1 to 10 $\mu$m, and most preferably to 0.2 to 8 $\mu$m.

The following is a description of a battery pack according to the present invention.

Figure 1:
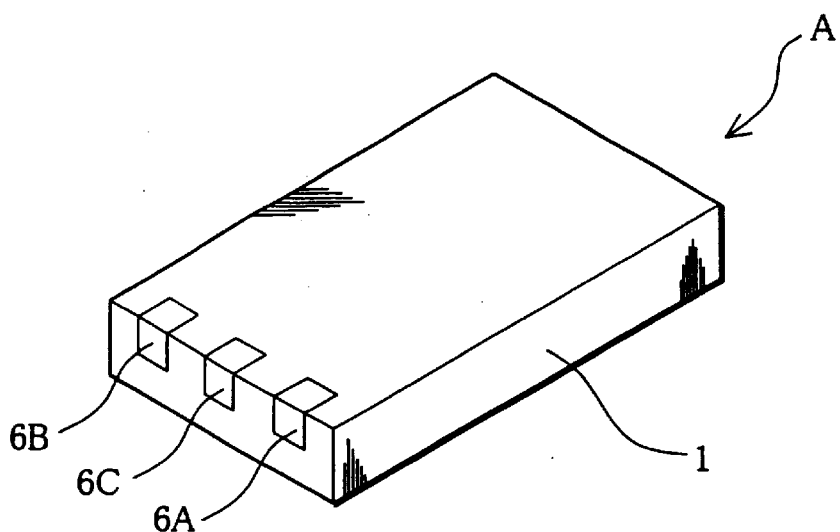
FIG. 1 is a perspective view showing an example of a battery pack.
Figure 2:
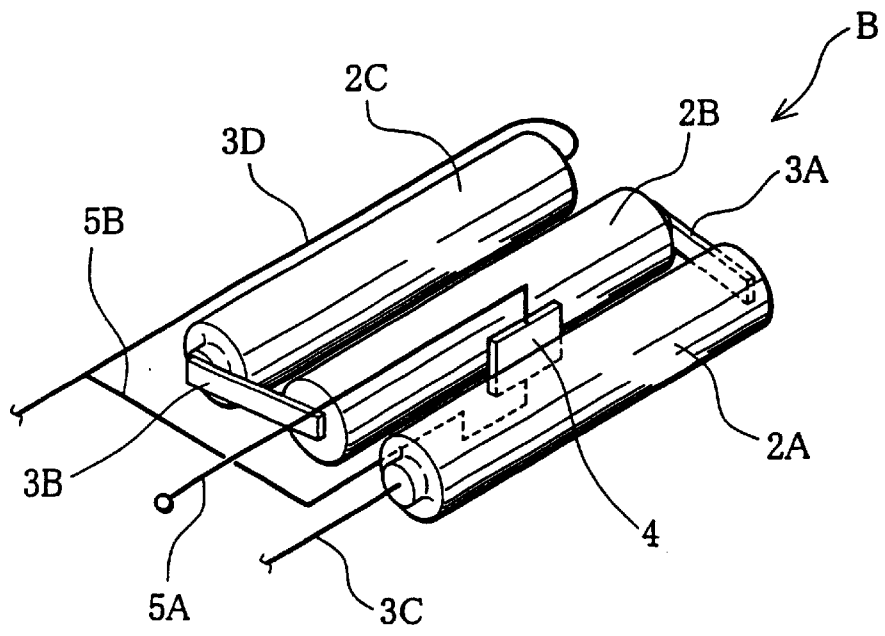
FIG. 2 is a perspective view showing an example of an battery group stored in the battery pack.

The battery pack according to the invention differs from the battery pack of the conventional structure shown in FIGS. 1 and 2 only in that the batteries constituting the battery group and/or the lead member is replaced by batteries and/or a lead member according to the invention.

In either case, the strength of weld between the battery container and the lead member is higher than in the case of the conventional battery pack that uses the battery group of which the battery container and the lead member are formed of an Ni-plated steel sheet each. Thus, the battery pack according to the invention is a highly reliable structure that cannot be easily broken by impact or any other external force.

In particular, the battery pack of the invention that contains therein a battery group manufactured by using the batteries and the lead member according to the invention is so reliable that it can serve as a useful driving power source for an electric vehicle, motor-assisted bicycle, etc.

EXAMPLES 1 to 6 AND COMPARATIVE EXAMPLE 1

Battery cans and covers for AA-size batteries were prepared. A soft steel sheet was used as the material of any of these members.

Plating baths for Ni—Fe alloys were prepared containing ferrous chloride, nickel chloride, and calcium chloride. In this case, various plating baths with different Fe concentrations were prepared with the ferrous chloride concentration varied from 210 to 380 g/L, nickel chloride concentration from 30 to 80 g/L, and calcium chloride from 150 to 180 g/L. Thiourea was added as required at the concentration of 1 g/L or less.

The battery cans and covers were electroplated in these plating baths, whereupon Ni—Fe alloy layers with different Fe contents were formed on the respective surfaces of the battery cans and covers. Appropriate plating conditions were selected including pHs of 0.9 to 1.5, bath temperatures of 60 to 90° C., and current densities of 3 to 5 $A/dm^2$. The plating time was adjusted so that the layer thickness was 3 $\mu$m.

Figure 3:
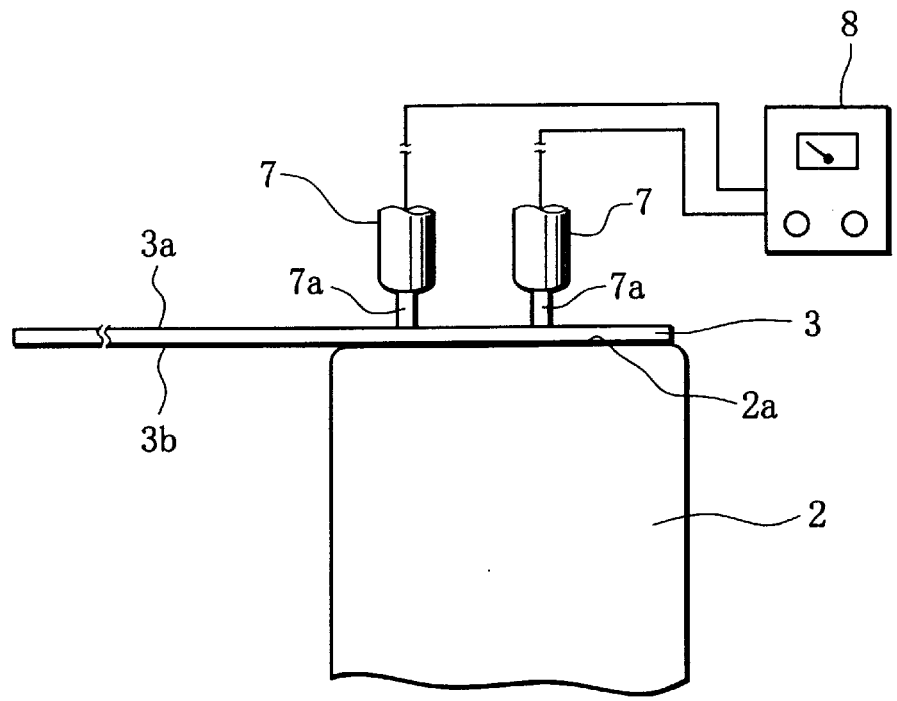
FIG. 3 is a schematic view for illustrating the parallel resistance welding method.

AA-size nickel-metal-hydride secondary batteries were assembled with use of the battery cans and covers obtained in this manner. A conventional lead member, formed of an Ni-plated soft steel sheet 0.15 mm thick and 5 mm wide, was put on the bottom surface of each battery, and the battery and the lead member were welded under the conditions shown in Table 1 by the parallel resistance welding method, as shown in FIG. 3. The pressure loading from welding electrodes applied to each lead member was 22 newtons (N).

The value of this pressure loading is the sum of forces applied to the two welding electrodes. The forces applied individually to the electrodes are set at substantially equal values (about 11 N each).

Figure 6:
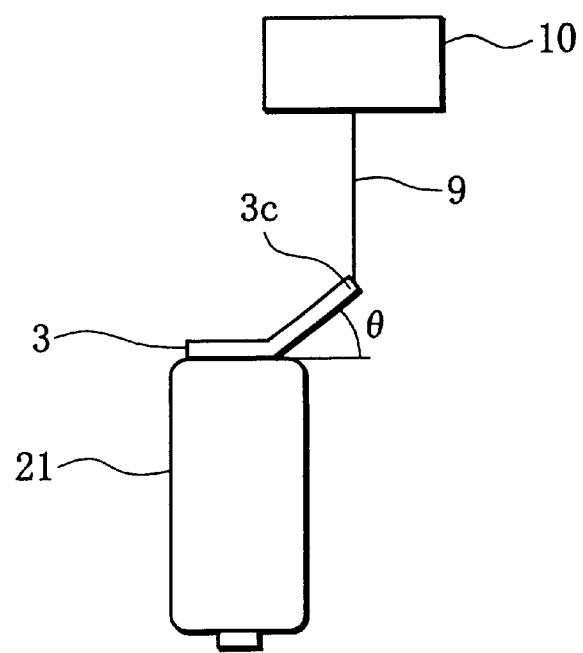
FIG. 6 is a schematic view for illustrating a method for measuring the strength of weld between the lead member and a battery.

Then, a measurement test for weld strength was conducted in the manner shown in FIG. 6. It is a test in which one end 3c of a lead member 3 welded to the bottom surface of a battery container 21 of a battery according to the invention is held by means of a chuck 9, and the chuck 9 is pulled up by means of a tension tester 10 to strip off the lead member 3. In doing this, the lead member 3 was pulled up in a direction substantially parallel to the central axis of the container 21 so that the force of the tester 10 to pull the chuck 9 increased at a substantially fixed rate. The pulling force (tensile strength) with which the lead member 3 was completely separated from the bottom surface of the container 21 was defined as the weld strength. Table 1 collectively shows mean values for 30 battery containers as the results of the test.

Comparative Example 1 represents the case where the battery container and the lead member are formed of an Ni-plated steel sheet each.

TABLE 1

|  | Comparative Example | Example No. | | | | | |
|---|---|---|---|---|---|---|---|
|  | 1 | 1 | 2 | 3 | 4 | 5 | 6 |
| Fe content of layer (Ni—Fe alloy) (% by atomic percentage) | 0 (layer of Ni only) | 5 | 10 | 20 | 30 | 40 | 50 |

TABLE 1-continued

|  |  |  | Comparative Example | Example No. | | | | | |
|---|---|---|---|---|---|---|---|---|---|
|  |  |  | 1 | 1 | 2 | 3 | 4 | 5 | 6 |
| Weld strength (N) | Welding current during welding operation: | 1.4 kA | 50.5 | 53.5 | 60.3 | 63.7 | 64.1 | 63.9 | 62.8 |
|  |  | 1.5 kA | 51.9 | 55.5 | 63.9 | 67.6 | 65.1 | 68.8 | 66.3 |
|  |  | 1.6 kA | 61.0 | 61.1 | 63.9 | 68.9 | 66.3 | 70.0 | 67.5 |

Table 1 reveals the following facts.

(1) In any of the Examples and Comparative Example 1, the weld strength increases as the welding current increases.

(2) Under the fixed resistance welding conditions, the strength of weld between the battery container and the lead member that are covered by the layer according to the invention is higher than that for the case of Comparative Example 1 that is formed of the conventional nickel-plated soft steel sheet only.

This indicates that, with use of the battery container according to the invention, a smaller welding current can produce the same weld strength although the lead member is formed of the conventional Ni-plated steel sheet.

(3) The higher the Fe content of the Ni—Fe alloy that constitutes the layer, the higher the weld strength is. If the Fe content is too high, however, the weld strength lowers instead. In the case where the layer is formed of an Ni—Fe alloy, therefore, the Fe content should preferably be restricted to about 50% or less by atomic percentage, and most preferably to about 10 to 45% by atomic percentage, in consideration of the problem of rusting also.

EXAMPLES 7 TO 11

Layers of an Ni—Fe alloy with the thicknesses shown in Table 2 were formed on battery containers for varied plating times with use of a plating bath that is adjusted in composition so that the Fe contents of the layers were 20% by atomic percentage. Then, 30 batteries were assembled using the individual battery containers, and the aforesaid lead member (formed of a Ni-plated steel sheet) was put on the bottom surface of each battery container. The lead member and the battery container were subjected to resistance welding in a manner such that they are supplied with a welding current of 1.5 kA under a pressure loading of 22 N from the welding electrodes.

The value of this pressure loading is the sum of forces applied to the two welded electrodes. The forces applied individually to the electrodes are set at substantially equal values.

The weld strength was measured in the same manner as in the cases of Examples 1 to 6. Table 2 shows the maximum and minimum values of the weld strength and mean values for the 30 batteries.

TABLE 2

|  | Example No. | | | | |
|---|---|---|---|---|---|
|  | 7 | 8 | 9 | 10 | 11 |
| Layer thickness ($\mu$m) | 2.5 | 3 | 4 | 5 | 6 |
| Weld strength (N) | | | | | |
| Mean value (n = 30) | 66.3 | 67.6 | 65.1 | 56.7 | 49.5 |
| Maximum value | 72.3 | 73.1 | 75.3 | 71.6 | 68.4 |
| Minimum value | 59.8 | 58.3 | 56.9 | 53.8 | 48.1 |

As seen from Table 2, the weld strength becomes inclined to lower if the layer thickness exceeds 5 $\mu$m. As the layer thickness increases, moreover, the weld strength tends to vary. Preferably, therefore, the layer thickness is adjusted to 5 $\mu$m or less. In the case where the thickness is about 3 $\mu$m, in particular, the weld strength is high and its variation is very small, so that stable quality control can be ensured.

EXAMPLE 12 AND COMPARATIVE EXAMPLE 2

A plated steel sheet of 0.3-mm thickness was prepared by coating the surface of a soft steel sheet of 0.3-mm thickness with an Ni—Fe alloy layer of 2.0-$\mu$m thickness formed of an Ni-25% Fe alloy, and it was molded into battery covers by plastic deformation.

One hundred batteries were assembled with use of these batteries. A soft steel lead member (formed of an Ni-plated steel sheet) of 0.15-mm thickness, having an Ni layer of 2.0-$\mu$m thickness thereon, was pressed against the surface of each cover under a pressure loading of 22 N, resistance welding was carried out with the welding currents shown in Table 3 for about 5 ms.

The value of this pressure loading can be defined in the same manner as in the cases Examples 1 to 11.

Then, the weld strength was measured in the same manner as in the cases of Examples 1 to 11. Table 3 shows the results of the measurement. The number of covers on which two nuggets remained after the separation of the lead member was measured and also shown in Table 3. The larger this number, the stabler the nuggets formed during the resistance welding are.

For comparison, covers having an Ni layer with the same thickness as the Ni-25% Fe alloy layer were alternatively subjected to resistance welding in like manner. Table 3 also shows the results for this case

TABLE 3

| Layer on cover | | | Example 12 Ni-25% Fe alloy layer | Comparative Example 2 Ni layer |
|---|---|---|---|---|
| Welding current (kA) | 1.0 | Number of covers on which two nuggets remain | 80 | 40 |
| | | Weld strength (N) | | |
| | | Means value (n = 100) | 42 | 24.5 |
| | | Variation | 28.3~47.2 | 19.6~35.7 |
| | 1.2 | Number of covers on which two nuggets remain | 100 | 60 |
| | | Weld strength (N) | | |
| | | Means value (n = 100) | 59.8 | 36.3 |
| | | Variation | 49.5~67.1 | 29.7~49.6 |
| | 1.4 | Number of covers on which two nuggets remain | 100 | 90 |
| | | Weld strength (N) | | |
| | | Means value (n = 100) | 68.6 | 51.9 |
| | | Variation | 56.3~72.4 | 38.4~67.9 |
| | 1.6 | Number of covers on which two nuggets remain | 100 | 100 |
| | | Weld strength (N) | | |
| | | Means value (n = 100) | 70.6 | 60.8 |
| | | Variation | 61.9~73.4 | 48.7~65.2 |

In the case of resistance welding for a battery (Comparative Example 2) using a cover without the Ni-25% Fe alloy layer, as seen from Table 3, two nuggets steadily remained only when a welding current of 1.6 kA was supplied. In the case of each battery according to the invention using the cover plated with the Ni-25% Fe alloy, on the other hand, two nuggets were able to be securely formed even though the welding current was 1.2 kA. The resulting weld strength was substantially equal to the strength obtained when Comparative Example 2 was welded with use of the welding current of 1.6 kA.

Thus, with use of each battery according to the invention, a small welding current can produce high weld strength although the lead member is formed of the conventional Ni-plated steel sheet.

EXAMPLE 13

Battery cans and covers for AA-size batteries were prepared. A soft steel sheet was used as the material of any of these members.

A plating bath for an Ni—Co alloy was prepared containing 250 g/L of nickel chloride, 15 g/L of cobalt chloride, and 15 g/L of boric acid.

The battery cans and covers were electroplated in this plating bath under conditions including a pH of 3, current density of 1.5 A/dm$^2$, and bath temperature of 20° C., whereupon an Ni-15% Co alloy layer of 3-$\mu$m thickness was formed on each of the respective surfaces of the battery cans and covers.

Thirty AA-size nickel-metal-hydride secondary batteries were assembled with use of these battery cans and covers. A lead member, formed of an Ni-plated soft steel sheet with 0.15 mm thick and 5 mm wide, was put on the bottom surface of each battery, and was subjected to resistance welding under the same conditions as in Examples 1 to 6.

Then, the weld strength was measured in the same manner as in the cases of Examples 1 to 6. The following is a description of the results of the measurement.

The weld strength was 62.5 N (mean value) for the welding current of 1.4 kA, 63.9 N (mean value) for 1.5 kA, and 65.1 N (mean value) for 1.6 kA.

Thus, even in the case of the batteries of which the battery container is plated with an Ni—Co alloy, higher weld strength than in the case of Comparative Example 1 can be obtained with use of the lead member that is formed of the conventional Ni-plated steel sheet.

EXAMPLE 14

A plating bath was prepared containing 220 g/L of nickel sulfate, 30 g/L of nickel chloride, 40 g/L of nickel formate, 4.8 g/L of cobalt sulfate, 0.8 g/L of ammonium sulfate, 2 g/L of formaldehyde, and 28 g/L of boric acid.

The battery cans and covers used in Example 13 were electroplated in this plating bath under conditions including a pH of 3.7, current density of 5 A/dm$^2$, and bath temperature of 65° C., whereupon an Ni-7% Co alloy layer of 3-$\mu$m thickness was formed on each of the respective surfaces of the battery cans and covers.

Twenty AA-size nickel-metal-hydride secondary batteries were assembled with use of these battery cans and covers. A lead member, formed of an Ni-plated soft steel sheet 0.15 mm thick and 5 mm wide, was put on the bottom surface of each battery, and was subjected to resistance welding under the same conditions as in Examples 1 to 6.

Then, the weld strength was measured in the same manner as in the cases of Examples 1 to 6. The following is a description of the results of the measurement.

The weld strength was 62.3 N (mean value) for the welding current of 1.4 kA, 61.7 N (mean value) for 1.5 kA, and 64.9 N (mean value) for 1.6 kA.

EXAMPLE 15 AND COMPARATIVE EXAMPLE 3

A low-carbon steel sheet (carbon concentration: 0.08%), 0.15 mm thick, 5.9 mm wide, and 30 mm long, was prepared as a substrate of a lead member.

On the other hand, a plating bath was prepared containing 240 g/L of nickel sulfate, 45 g/L of nickel chloride, 30 g/L of boric acid, and 1.5 g/L of saccharin, and an Ni layer of 3-$\mu$m thickness was formed as an under layer on the whole surface of the substrate under conditions including a pH of 4.0, bath temperature of 45° C., and current density of 4 A/dm$^2$.

Further, a plating bath was prepared containing 300 g/L of nickel chloride, 50 g/L of stannous chloride, 35 g/L of ammonium hydrofluorate, and 25 g/L of sodium fluoride. One side of the Ni layer was masked and immersed in the plating bath, whereupon an Ni—Sn alloy layer of 0.3-$\mu$m thickness was formed on the one side of the Ni layer under conditions including a bath temperature of 65° C. and current density of 2.5 A/dm. Thus, the lead member 31 according to the invention was manufactured having the profile shown in FIG. 5. The Ni—Sn alloy contained 35 wt % of Ni and 65 wt % of Sn.

An under layer having an Ni surface was prepared as Comparative Example 3 without forming the Ni—Sn alloy layer thereon.

On the other hand, thirty AAA-size nickel-metal-hydride batteries (batteries of Comparative Example) were prepared having a battery container obtained by forming an Ni layer of 3 to 3.5-mm thickness on the surface of a low-carbon steel sheet (carbon concentration: 0.04%) of 0.3-mm thickness.

The aforesaid lead member was put on the bottom surface of each battery, a pressure loading of 22 N (sum of forces on two welding electrodes) is applied by means of welding electrodes, and the lead member 31 was welded to the battery container with welding currents of 1.6 kA and 1.7 kA by the parallel resistance welding method, as shown in FIG. 3. The forces applied individually to the two electrodes are set at substantially equal values.

Here the surface of the Ni—Sn—layer was faced on the bottom surface of each battery.

Figure 7:
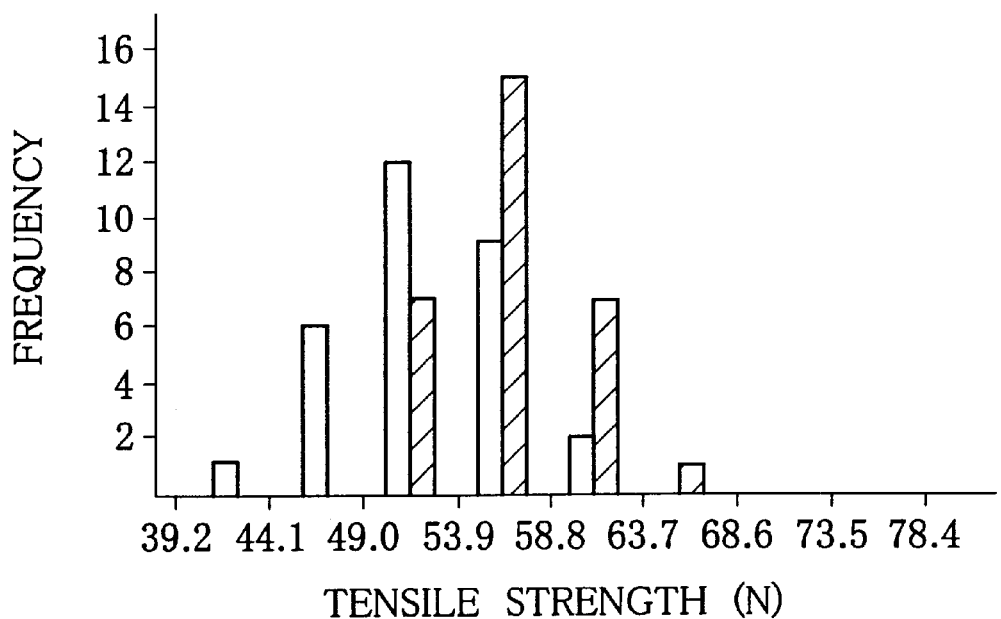
FIG. 7 is a graph showing the frequency distribution of the weld strength obtained when a lead member and a battery of Example 15 are subjected to resistance welding with use of a welding current of 1.6 kA.
Figure 8:
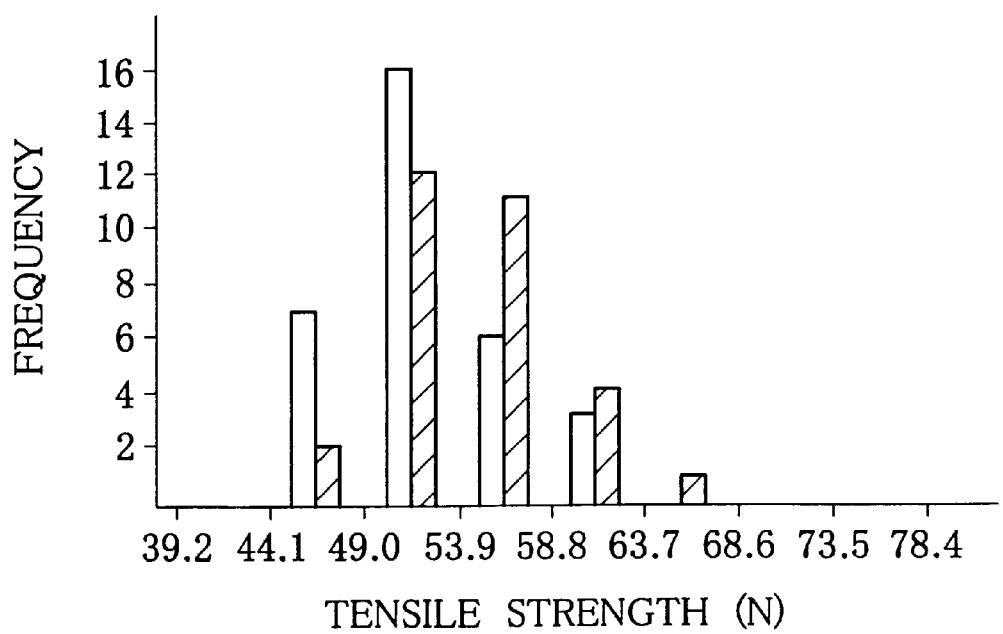
FIG. 8 is a graph showing the frequency distribution of the weld strength obtained when the lead member and the battery of Example 15 are subjected to resistance welding with use of a welding current of 1.7 kA.

Then, a test was conducted such that one end of the lead member 31 welded to the bottom surface of each battery is held by means of a chuck, and the chuck is pulled up by means of a tension tester to strip off the lead member 31. In doing this, the relative positions of the lead member 31, battery, and tension tester were adjusted so that an angle θ between the lead member 31 and the bottom surface of the battery is always fixed, and the force of the tester to pull the chuck was increased at a substantially fixed rate. The pulling force (tensile strength) with which the lead member 31 was completely separated from the bottom surface of the battery was measured and defined as the weld strength. FIGS. 7 and 8 show the results of the test.

FIG. 7 shows the results obtained when the welding current was 1.6 kA, while FIG. 8 shows the results obtained when the welding current was 1.7 kA. In each of these drawings, hatched bars represent the case where the lead member 31 according to the invention was used, while blank bars represent the case where the lead member of Comparative Example 3 was used.

Even if the battery container is formed of an Ni-plated steel sheet, parallel resistance welding ensures higher and stabler general weld strength for the lead member according to the invention than for the conventional lead member (comparative example), as seen from FIGS. 7 and 8.

EXAMPLE 16

A lead member 31 was manufactured having the same profile as that of Example 15 except that its under layer was a Cu layer of 0.8-μm thickness formed by using a plating bath of pyrophosphoric acid and that its Ni—Sn alloy layer is an Ni-65% Sn alloy layer of 0.6-μm thickness formed under the plating conditions of Example 15.

Figure 9:
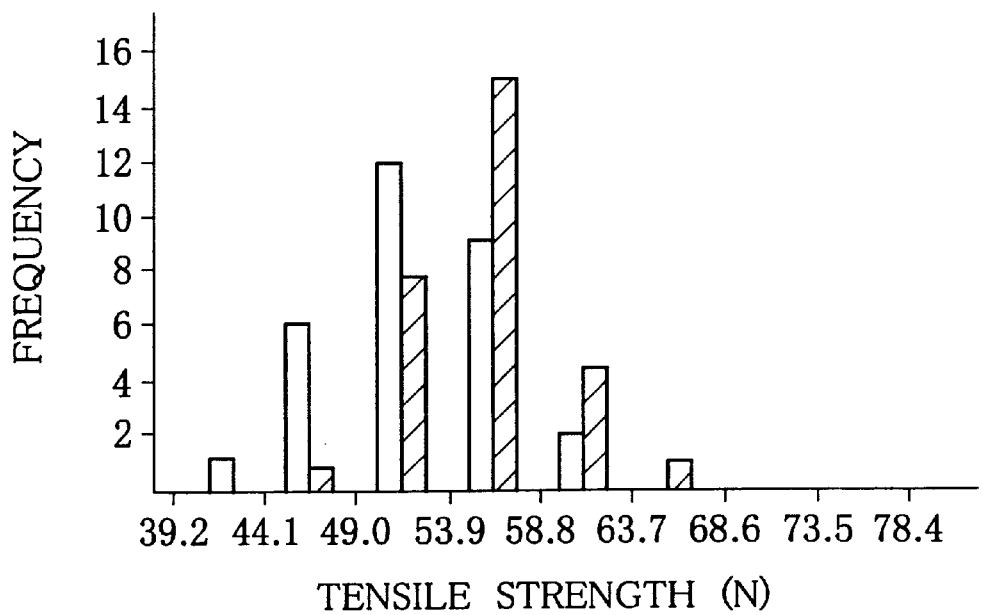
FIG. 9 is a graph showing the frequency distribution of the weld strength obtained when a lead member and a battery of Example 16 are subjected to resistance welding with use of the welding current of 1.6 kA.
Figure 10:
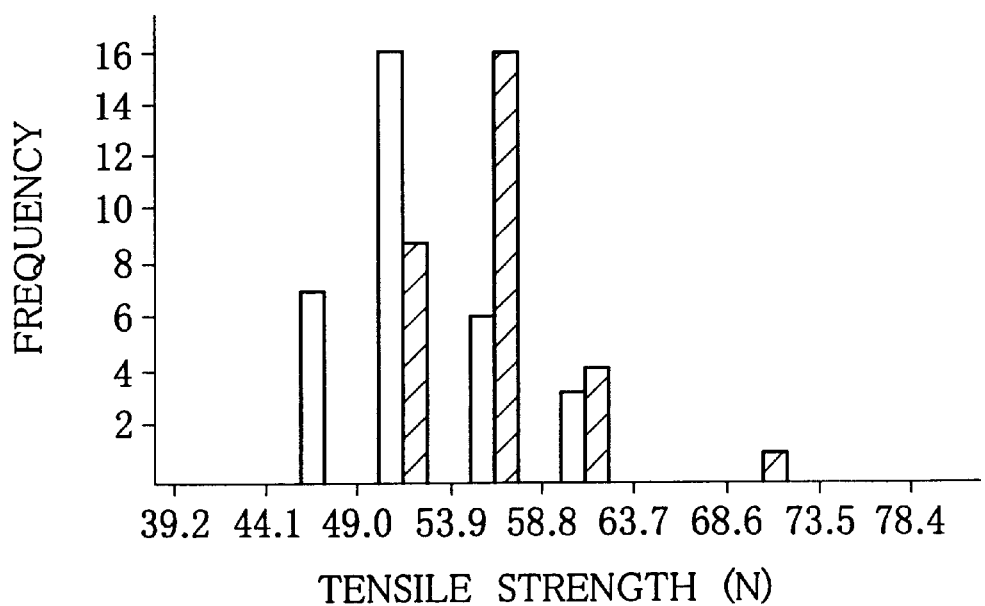
FIG. 10 is a graph showing the frequency distribution of the weld strength obtained when the lead member and the battery of Example 16 are subjected to resistance welding with use of the welding current of 1.7 kA.

Thirty nickel-metal-hydride batteries used in Example 15 were prepared, and the lead member was resistance-welded to each of the batteries in the same manner as in Example 15. Thereafter, the weld strength was measured in the same manner as in Example 15. FIGS. 9 and 10 show the results of the measurement.

FIG. 9 shows the results obtained when the welding current was 1.6 kA, while FIG. 10 shows the results obtained when the welding current was 1.7 kA. In each of these drawings, hatched bars represent the case where the lead member 31 according to the invention was used, while blank bars represent the case where the lead member of Comparative Example 3 was used.

Even if the under layer is formed of a Cu layer, parallel resistance welding ensures higher and stabler general weld strength for the lead member according to the invention, the surface of which is formed of an Ni—Sn alloy layer, than for the conventional lead member (comparative example), as seen from FIGS. 9 and 10.

EXAMPLE 17

Figure 11:
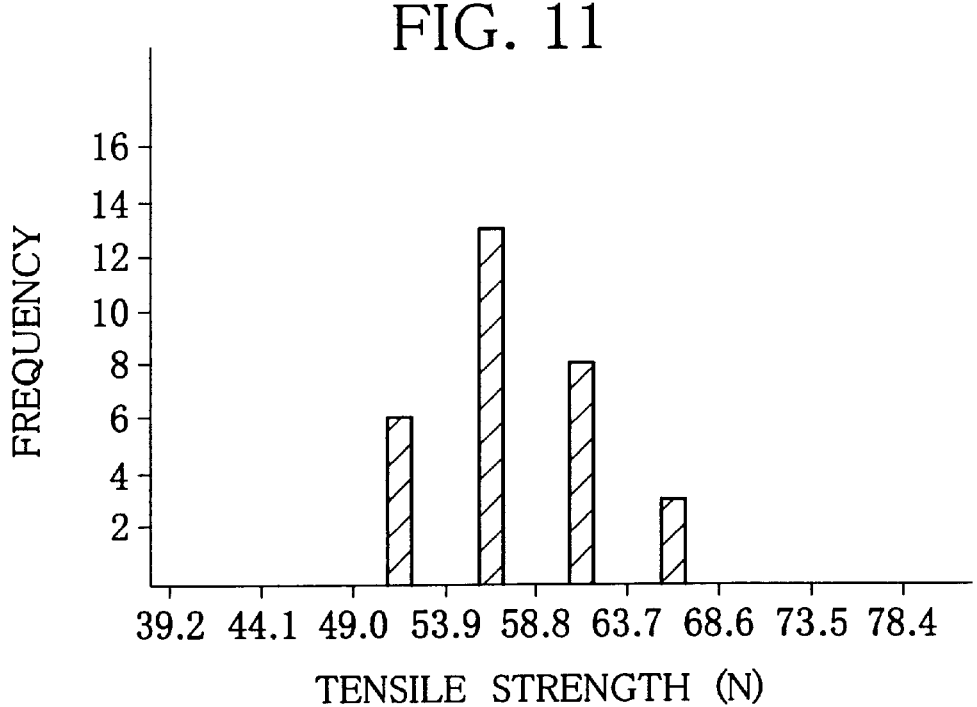
FIG. 11 is a graph showing the frequency distribution of the weld strength obtained when a battery of Example 17 and the lead member of Example 15 are subjected to resistance welding with use of the welding current of 1.6 kA.
Figure 12:
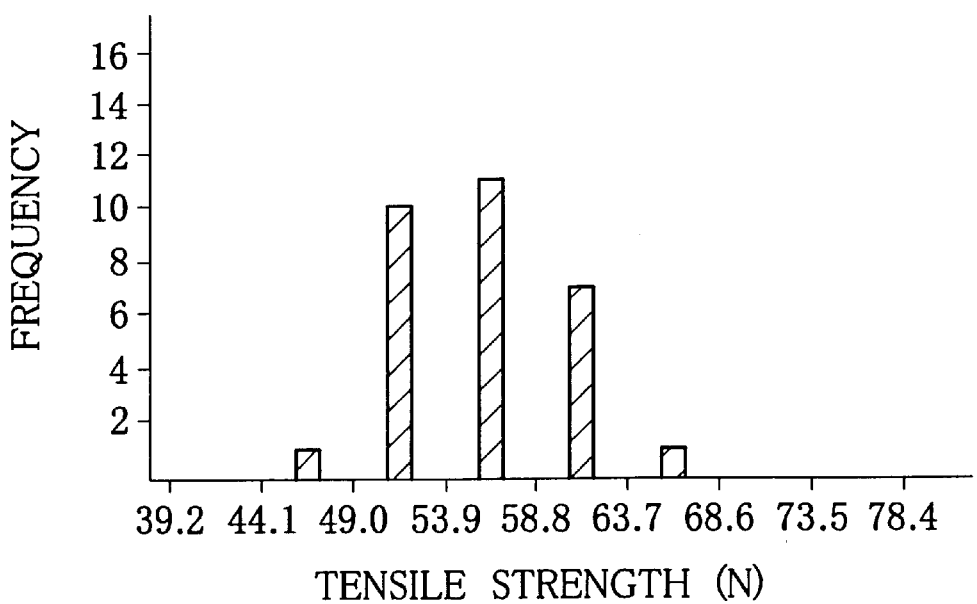
FIG. 12 is a graph showing the frequency distribution of the weld strength obtained when the battery of Example 17 and the lead member of Example 15 are subjected to resistance welding with use of the welding current of 1.7 kA.

A battery having an Ni—Fe alloy layer of 3.0-μm thickness formed of an Ni-20% Fe alloy, on its container surface, and the lead member of Example 15 were resistance-welded under the same conditions as in Example 15 by the method used in the cases of Examples 1 to 6, and the weld strength was measured. FIGS. 11 and 12 show the results of the measurement.

FIG. 11 shows the results obtained when the welding current was 1.6 kA, while FIG. 12 shows the results obtained when the welding current was 1.7 kA.

What is claimed is:

1. A battery container for a battery connected by a lead member, said lead member comprising a substrate and an alloy layer mainly composed of 25 to 60 wt % Ni and 40 to 75 wt % of Sn for forming a battery pack, the battery container comprising:

an outer surface; and a layer of an Ni-based alloy covering a part or the whole of the outer surface of the battery container, said outer surface being adapted to be welded to said lead member.

2. The battery container according to claim 1, wherein said Ni-based alloy comprises an Ni—Fe alloy, Ni—Co alloy, Ni—Zn alloy, or Ni—Fe—Co alloy.

3. The battery container according to claim 2, wherein said Ni-based alloy comprises an Ni—Fe alloy, the Fe content of said Ni—Fe alloy is 50% by atomic percentage or less and greater than zero.

4. The battery container according to claim 1, wherein the thickness of said outer surface layer is 5 μm or less and greater than zero.

5. The battery container according to claim 3, wherein the thickness of said outer surface layer is 4.5 μm or less and greater than zero.

6. A lead member for battery connection for forming a battery pack, the lead member comprising:

a substrate mainly composed of low carbon-steel or Ni; and an alloy layer mainly composed of Ni and Sn, said alloy layer being formed at least on a surface of the substrate which is adapted to be welded to an outer surface of a battery by a parallel resistance welding method.

7. A lead member for battery connection, the lead member comprising:

a substrate;

an under layer formed on the substrate, the under layer being an Ni layer, Ni—Fe alloy layer, Cu layer, or Cu—Sn alloy layer; and an alloy layer mainly composed of Ni and Sn, said alloy layer being formed on the under layer over at least a portion of the substrate adapted to be welded to an outer surface of the battery.

8. A lead member for battery connection for forming a battery pack, the lead member comprising:

a substrate; and an alloy layer mainly composed of 25 to 60 wt % Ni and 40 to 75% Sn, said alloy layer being formed on at least a portion of the substrate adapted to be welded to the outer surface of the battery by a parallel resistance welding method.

9. A battery pack comprising:
a group of batteries, each having an outer surface;
at least one lead member for connecting the group of batteries to one another; and
a shell for storing the group of batteries therein;
said lead member comprising a substrate, an under layer formed on the substrate, and an alloy layer mainly composed of Ni and Sn;
the under layer being an Ni layer, Ni—Fe alloy layer, Cu layer, or Cu—Sn alloy layer; and
said alloy layer being formed on the under layer over at least a portion of the substrate welded to an outer surface of the battery by a parallel resistance welding method.

10. A battery pack comprising:
a group of batteries, each having an outer surface;
at least one lead member for connecting the group of batteries to one another; and
a shell for storing the group of batteries therein;
said lead member comprising a substrate mainly composed of low carbon-steel or Ni, and an alloy layer mainly composed of Ni and Sn, said alloy layer being formed at least on a surface of the substrate which is welded to an outer surface of the battery; and
said lead member welded by a parallel resistance welding method.

11. A battery pack comprising:
a group of batteries, each having a battery container including an outer surface, and a layer of an Ni-based alloy covering a part or the whole of said outer surface;
at least one lead member for connecting the group of batteries to one another; and
a shell for storing the group of batteries therein;
said lead member comprising a substrate mainly composed of low carbon-steel or Ni, and an alloy layer mainly composed of Ni and Sn, said alloy layer being formed at least on a surface of the substrate; and
said lead member being welded by a parallel resistance welding method to the outer surface of the battery.

12. A lead member for battery connection for forming a battery pack, the lead member comprising:
a substrate mainly composed of low carbon-steel or Ni; and
an electrodeposited alloy layer mainly composed of Ni and Sn, said alloy layer being formed on at least a portion of the substrate adapted to be welded to an outer surface of a battery by a parallel resistance welding method.

13. The lead member according to claim 7, wherein said alloy layer comprises an electrodeposited alloy layer.

14. The lead member according to claim 8, wherein said alloy layer comprises an electrodeposited alloy layer.

15. The lead member according to claim 7, wherein said alloy layer comprises an Ni—Sn based alloy containing 25 to 60 wt % of Ni and 40 to 75 wt % of Sn.

16. The lead member according to claim 8, further comprising an under layer formed between the substrate and the alloy layer, the under layer being an Ni layer, Ni—Fe alloy layer, Cu layer, or Cu—Sn alloy layer.

17. The lead member according to claim 12, wherein said electrodeposited alloy layer comprises an Ni—Sn based alloy containing 25 to 60 wt % of Ni and 40 to 75 wt % of Sn.

18. The lead member according to claim 12, further comprising an under layer formed between the substrate and the electrodeposited alloy layer, the under layer being an Ni layer, Ni—Fe alloy layer, Cu layer, or Cu—Sn alloy layer.

19. A battery pack comprising:
a group of batteries, each having an outer surface;
at least one lead member for connecting the group of batteries to one another; and
a shell for storing the group of batteries therein;
said lead member comprising a substrate, and an alloy layer mainly composed of 25 to 60 wt % Ni and 40 to 75 wt % Sn, said alloy layer formed on at least a portion of the substrate welded to an outer surface of the battery by a parallel resistance welding method.

20. A battery pack comprising:
a group of batteries, each having a battery container including an outer surface, and a layer of an Ni-based alloy covering a part or the whole of said outer surface;
at least one lead member for connecting the group of batteries to one another; and
a shell for storing the group of the batteries therein;
said lead member comprising a substrate mainly composed of low carbon-steel or Ni, and an electrodeposited alloy layer mainly composed of Ni and Sn, said alloy layer being formed on at least a portion of the substrate welded to said outer surface by a parallel resistance welding method.

21. A battery container for a battery connected by a lead member comprising a substrate mainly composed of low carbon-steel or Ni and an alloy layer mainly composed of Ni and Sn for forming a battery pack, the battery container comprising:
an outer surface; and
a layer of an Ni-based alloy covering a part or the whole of said outer surface, said outer surface being adapted to be welded to said lead member.

22. The battery container according to claim 21, wherein said Ni-based alloy comprises an Ni—Fe alloy, Ni—Co alloy, Ni—Zn alloy, or Ni—Fe—Co alloy.

23. The battery container according to claim 22, wherein said Ni-based alloy comprises an Ni—Fe alloy, the Fe content of said Ni—Fe alloy is 50% by atomic percentage or less and greater than zero.

24. The battery container according to claim 21, wherein the thickness of said outer surface layer is 5 $\mu$m or less and greater than zero.

25. The battery container according to claim 23, wherein the thickness of said outer surface layer is 4.5 $\mu$m or less and greater than zero.

26. A battery pack comprising:
a group of batteries, each having a battery container including an outer surface, and a layer of an Ni-based alloy covering a part or the whole of said outer surface;
at least one lead member for connecting the group of batteries to one another; and
a shell for storing the group of batteries therein;
said lead member comprising a substrate, and an alloy layer mainly composed of 25 to 60 wt % of Ni and 40 to 75 wt % of Sn, said alloy layer being formed on at least a portion of the substrate adapted to be welded to the outer surface of the battery.

* * * * *